Nov. 27, 1956     C. F. TULLY     2,771,676

MEANS FOR EXTRACTING TEETH

Filed April 6, 1953

INVENTOR.
CHARLES F. TULLY
BY
A.B. Bowman
ATTORNEY

United States Patent Office 2,771,676
Patented Nov. 27, 1956

2,771,676

MEANS FOR EXTRACTING TEETH

Charles F. Tully, San Diego, Calif.

Application April 6, 1953, Serial No. 346,946

5 Claims. (Cl. 32—62)

My invention relates to a means for and method of extracting teeth, more particularly a means and method whereby the tooth is released from its natural locked relation with its setting so that it is easily removed without effort in pulling the same, and the objects of my invention are:

First, to provide a shearing tweezers means that will cut the alveolar process on the labial side of the tooth and inwardly on opposite sides of the tooth near its middle so that that portion against the labial side of the tooth is easily removed permitting the tooth to be shifted sideways so that it relieves the lock on the opposite side of the tooth and permits the tooth to be easily removed.

Second, to provide a bifurcated shearing tweezer means of spring steel which will yield sufficiently to pass around the root of the tooth on opposie sides for cutting the labial alveolar process which locks the tooth in position.

Third, to provide a novel shearing tweezer means of this class.

Fourth, to provide a novel method of extracting teeth by which the labial alveolar process is sheared and weakened to permit lateral movement of the tooth and easy removal thereof.

Fifth, to provide a method of this class in which one or a large number of teeth may be readily removed or extracted with but very little pulling effort.

Sixth, to provide a method of this class in which the labial alveolar process may be removed prior to the extraction of the teeth thus providing for the ready suturing of the gum over the opening from which the tooth has been removed.

Seventh, to provide a method of this class in which the alveolar process has been removed, therefore the gum may be more quickly provided with a plate with teeth inasmuch as the alveolar process has to be desolved in the usual manner before the gums are properly set for the plate with the teeth, and Eighth, to provide a means and method of this class which is very simple and economical to make, easy to operate, efficient in its action.

Figure 1:
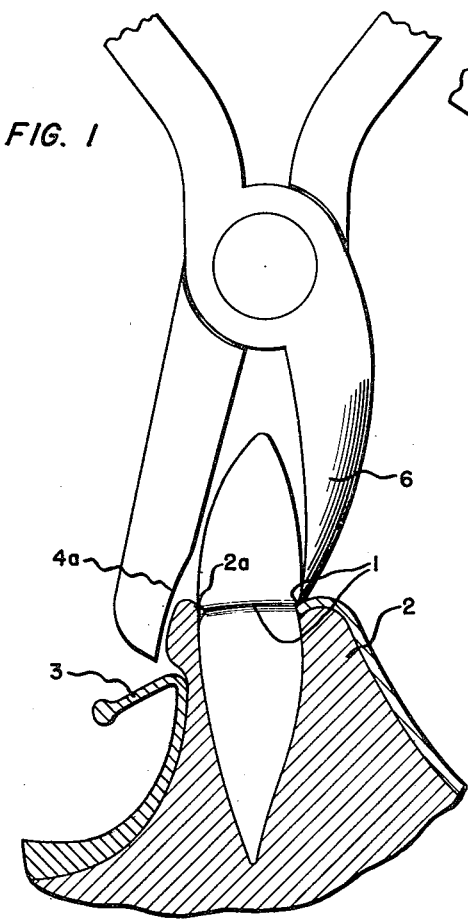
Figure 2:
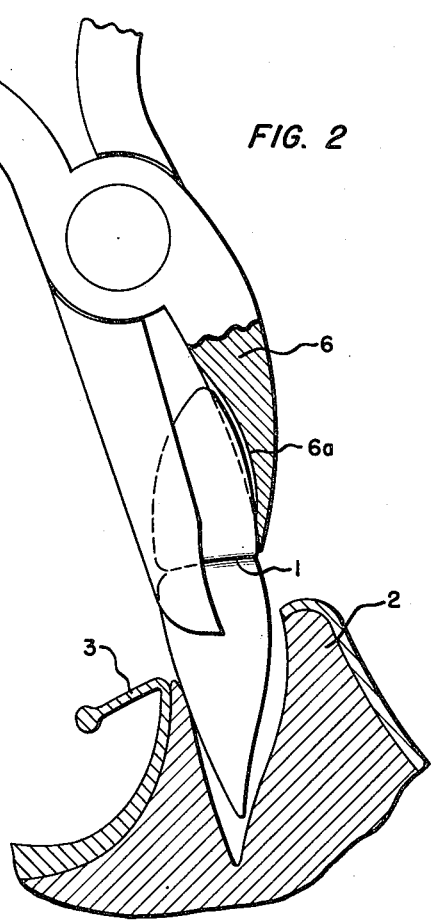
Figure 4:
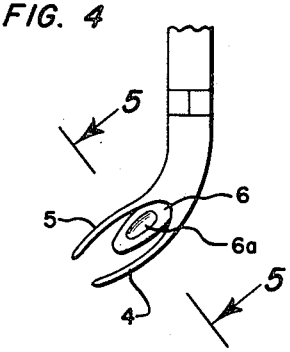
Figure 5:
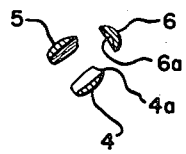
Figure 3:
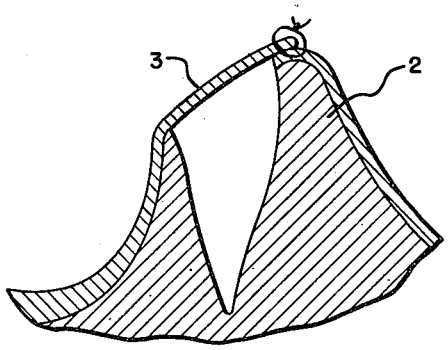

With these and other objects in view as will appear hereinafter, my invention consists of the certain novel shearing tweezer means and the certain novel method of extracting teeth as will hereinafter be described in detail and particularly set forth in the appended claims, reference being had to the accompanying drawings which form a part of this application in which:

Figure 1 is a partial, sectional and elevational view showing a tooth positioned in the alveolar process in interlocked relation therewith showing my special shearing tweezer means positioned ready for cutting the labial alveolar process for the quick removal of the tooth by slight lateral movement brought about by the shearing tweezers without pulling action. Fig. 2 is a partial, sectional and elevational view showing the additional step of removing the tooth from the process. Fig. 3 is a sectional view of the process and gum showing the gum positioned and sutured ready for the healing process, Fig. 4 is a view at a right angle of the shearing tweezers on a reduced scale from that of the other views of the drawings and Fig. 5 is a sectional view of the tweezers taken from the line 5—5 of Fig. 4.

Similar characters of reference refer to similar parts and portions throughout the several views of the drawings.

In order to provide a clear understanding of applicant's means and methods, applicant hereby defines in a concise manner the structural relation of the tooth with the process in which it is supported and its interlocked relation with said process. It is to be noted from the drawings as shown in Fig. 1 that the tooth does not rest upon its apex, but the bearing is distributed to the sides of the cavity, and in this manner it is capable of sustaining tremendous pressure without damage, but on the other hand if inverted the tooth would fall out of its own accord if not attached by ligaments, but these ligaments in themselves are insufficient and even without these ligaments, the tooth will still have to be extracted owing to the interlocking key formed by the recess 1 around the tooth in which the process or tooth support 2 extends, thus forming a key or lock preventing the loosening of the tooth from the process. This key or lock is a slightly thickened strip of the process just below the gingivae which overlaps a slight swell on the root of the tooth just below the neck, all as shown in Fig. 1 of the drawings. It is not very thick and only three or four millimeters wide, but sufficiently strong to hold the tooth against great pulling pressure and sometimes results in tearing loose sections of the process. However, with the labial alveolar process portion weakened by means of the shearing tweezers the tooth will then come away almost of its own accord. If the tooth is removed without this shearing process weakening method, then this process must be removed after the tooth is extracted in order to suture the gums for a denture so that applicant in place of removing the lock last, removes it first thus providing for more easily extracting the tooth.

Applicant's method of extracting teeth is to carefully peel back the gum portion 3 about a quarter of an inch as shown in Figures 1 and 2 of the drawings to uncover that thickened, bony portion which acts as a lock on the labial surface of the tooth.

The shearing and extractor tweezer means consists of three main parts, 4, 5, and 6, shown best in Fig. 4. These members 4 and 5 are provided on their inner sides with very sharp, thin, engaging edges 4a, which easily cut the process portion 2a and yieldably extend around the sides of the tooth root between the teeth, shearing this portion 2a and removing the lock. The portion 6, it will be noted, is provided on its inner side with a concave portion 6a which engages the tooth portion on the opposite side from the portion 4a and when pressed together, forces the tooth slightly sideways between these members 4 and 5 which yield enough to permit the tooth to pass out between the members 4 and 5. It will be here noted that these shearing portions 4 and 5 cut cleanly through the bone one on each side of the root, then on into the septum until there is enough relief to cause the tooth to pop out, it being noted that the construction of the members 4, 5, and 6 are not made to pull a tooth, but it must be shoved just a little in using, for if you pull in the least, the instrument will simply slip out of place without damage, but when you shove slightly and simply squeeze, the tooth comes popping out between the blades. Fig. 3 shows the process gone and gum flap sutured in place.

It will be noted that with applicant's means and methods of extracting, the root is not grasped, squeezed or crushed, but the lingual jaw of applicant's means must be forced down sufficiently over the alveolar to engage the root of the tooth which is then forced out between the blades 4 and 5 on the labial side with a minimum destruction to either root or bone. The damage is thus trifling compared to the conventional forceps and the time of operating considerably cut down, and the patient is not subjected to a high-pressure pulling action which is necessary in some cases with a tough one until it is finally dug out bodily.

Though I have shown and described a particular tweezer means used for extracting teeth and a particular method of extracting teeth, I do not wish to be limited to this particular means nor to the particular method, but desire to include in my invention the means and method substantially as set forth in the appended claims.

Having thus described my invention what I claim as new and desire to secure by Letters Patent is:

1. A shearing tooth extractor means consisting of a concave tooth engaging member and a bifurcated shearing member of greater length than said tooth engaging member pivotally connected therewith the bifurcated members being spaced apart a sufficient height and width to pass around the opposite sides of the tooth and arranged to cut the process on the labial side of the tooth and pass along the side walls of the tooth separating the process from said tooth.

2. A shearing tooth extractor means consisting of a concave tooth engaging member and a bifurcated shearing member of greater length than said tooth engaging member pivotally connected therewith the bifurcated members being spaced apart a sufficient height and width to pass around the opposite sides of the tooth and arranged to cut the process on the labial side of the tooth and pass along the side walls of the tooth separating the process from said tooth, said bifurcated shearing members being yieldable laterally on engagement with the side walls of the tooth.

3. A shearing tooth extractor means consisting of an elongated tooth engaging member and a bifurcated shearing member of greater length than said tooth engaging member pivotally connected therewith the bifurcated members being spaced apart a sufficient height and width to pass around the opposite sides of the tooth and arranged to cut the process on the labial side of the tooth and pass along the side walls of the tooth separating the process from said tooth, said tooth engaging member provided with a concave tooth engaging portion.

4. A shearing tweezer tooth extracting means consisting of a bifurcated tweezer member means, said bifurcated member means provided with cutting edges spaced a sufficient height and width to permit the tooth to pass between said bifurcated members and another tooth engaging member pivotally connected therewith arranged to engage the opposite side of the tooth from said bifurcated members.

5. A shearing tweezer tooth extracting means consisting of a bifurcated tweezer member means, said bifurcated member means provided with cutting edges spaced a sufficient height and width to permit the tooth to pass between said bifurcated members and another tooth engaging member pivotally connected therewith arranged to engage the opposite side of the tooth from said bifurcated members, said members of said bifurcated portion being yieldable on engagement with the walls of the tooth in its shearing action.

References Cited in the file of this patent

UNITED STATES PATENTS 436,210     Burger _____ Sept. 9, 1890

OTHER REFERENCES

Greenbaum, May, "The Practice of Dentistry"; D. Appleton & Co.; New York 1912; pages 422–423. (Copy available in Div. 55.)